United States Patent Office 3,563,844
Patented Feb. 16, 1971

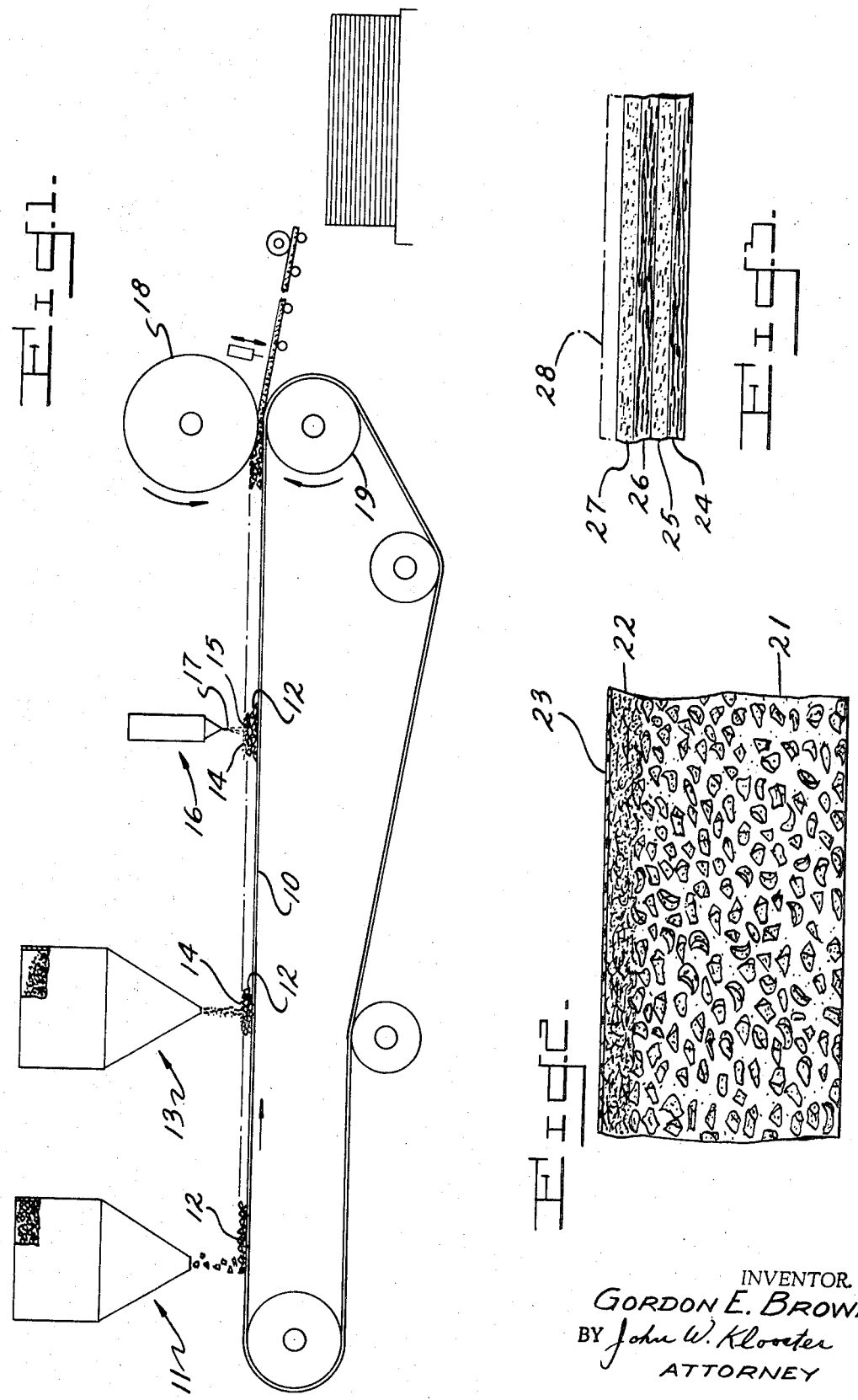

3,563,844
WOOD OVERLAY PRODUCTS AND THEIR MANUFACTURE
Gordon E. Brown, Seattle, Wash., assignor to Monsanto Company, St. Louis, Mo., a corporation of Delaware
Continuation-in-part of application Ser. No. 390,183, Aug. 17, 1964. This application Dec. 2, 1968, Ser. No. 780,312
Int. Cl. B32b 5/28, 27/12, 27/14, 27/42
U.S. Cl. 161—158                                        5 Claims

ABSTRACT OF THE DISCLOSURE

Composite low density wood-resin overlays prepared by compressing a composite layered structure which includes a mat of resin coated comminuted wood chips, an interlayer of a wood fiber and phenolic resin and a face coating of a certain phenolic resin. The overlays are useful as synthetic facing veneers in plywood manufacture.

RELATED APPLICATION

This application is a continuation-in-part of my copending application, Ser. No. 390,183, filed Aug. 17, 1964, and now abandoned.

BACKGROUND

Overlays for wooden substrates are usually used for one or more of the following reasons: (1) To cover surface defects and blemishes so as to provide a surface which is either itself decorative or at least prepared for the application of a decorative finish, such as paint, lacquer, films, etc.; (2) to upgrade the product performance properties, at least for specific applications; (3) to produce a product which has a higher commercial value than would be made if no overlay were used (i.e., upgrading low grade plywood); and/or (4) to produce a product which has a cheaper commercial value than would be made if no overlay were used (i.e., producing a plywood having an imitation finish comparable to a high priced plywood).

It is, for example, obvious that surfaces exhibiting durability under normal exterior use conditions and accelerated test conditions, such as for instance, significant resistance to, e.g., water and chemicals, checking, grain-raise, fiber pop-up, abrasion or denting during handling, etc., as well as exhibiting marked tensile strength in the overlay itself, as distinguished from the substrate, would find many uses. This latter requirement of strength in the overlay is important in securing the dimensional stability and continued surface integrity after aging necessary to a high quality and durable overlay. The high and medium density overlays, i.e., usually resin-impregnated paper sheets, presently on the market meet many of these requisites, but only at a premium price. They, therefore, have not found widespread use and many applications where cost is a prime factor remain unexploited. For example, reusable concrete forms require the above as well as other functional properties. The mass market of home and commercial paneling also demands such properties.

In the field of plywood, the problem is not one of merely overlaying a plywood for decorative purposes but of providing functional wooden products possessed of superior surface properties and having sufficient strength of their own accord to find a great many end use applications.

While the surface appearance and in some cases the functional properties have been improved, none of the prior art overlays for use on plywood possess surface properties which will allow external exposure to atmospheric conditions without additional treatment, e.g., painting, varnishing, etc.

The prior art has recorded various attempts to improve the surface properties of wood sheet products without resorting to the use of overlaid plywood; however, most such attempts have been directed toward products of the fiberboard or particle-board types, there being a definite and obvious distinction between such board products and plywood. Thus, one approach to upgrade poorer grade plywood veneers is that taken by Welch (see U.S. Pats. 2,419,614 and 2,606,138) wherein a plywood surface is overlaid with a sawdust-resin mixture; such expedients, though, are merely decorative and do little or nothing to improve upon the functional properties of the substrate. A somewhat different approach is described by Rogers (see U.S. Pat. 2,817,617) where a surface layer of resin treated wood flakes is applied to a chipboard before the final pressing and consolidation step in the manufacture thereof. Another approach is shown by Goss (see U.S. Pat. 2,673,370) who describes a method for providing a hard, glossy surface on sheet lumber made from a mixture of fiberized ligno-cellulosic material and a hydroplastic bonding agent; this method comprises applying water to the surface of the plastic-fiber mat to produce a very high moisture content in the surface region immediately prior to the pressing step. Still another approach is taught by Gregory et al. (see U.S. Pat. 3,249,667) who apply in place of water, a thermoplastic or thermosetting resin solution to the surface of a fiberboard mat prior to consolidation. The growing scarcity of woods suitable for use in the manufacture of high grade plywood, especially of wood suitable for use as veneers under the thin overlays conventionally used has created a need in the art for means of producing better overlays for plywood which not only will have better use properties, such as weatherability, paint hold out, and the like, as above indicated, but also will have the capacity to be used over the relatively low-grade veneer materials used in plywoods.

There has now been discovered a composite structure in sheet form which has a facing surface with superior weathering, paint hold out, texture and other properties and which has structural integrity which enables it to be safely handled, stored, shipped, etc., as an integral article. The facing surface of this composite structure is well suited for use as an overlay surface on plywood. At the same time, this composite structure is also well suited for use as a synthetic facing veneer in a plywood laminate, thereby replacing what heretofore has been a wooden veneer. This not only produces a plywood structure with the properties of a high quality overlay but also with the properties of a high quality plywood structure, as respects such physical performance characteristics as strength, weatherability, paintability, etc. In addition, this new overlay or synthetic veneer obviates the need for a high-quality wood facing veneer, such as heretofore used in plywood intended for overlay use.

This new overlay composite structure is made from relatively inexpensive and readily available starting materials. It has a combination of composition and physical properties fundamentally different from those of such conventional synthetic cellulosic sheetlike construction materials like fiberboard or particle board. These latter materials, as is well known in the art, are not suitable for laminating to or into a plywood intended for use in the vast majority of external structural and construction utilities which require high strength, high performance, building sheet material.

Consequently, there exists in the plywood industry a definite need for an overlay composite possessed of excellent surface properties yet inexpensive enough to be used in many applications which do not warrant the expense of the medium and high density overlays.

DRAWINGS

The attached drawings are provided for purposes of illustration and description and form a part of the specification. Thus, FIG. 1 is a highly diagrammatic view illustrating one process for making the overlays of the present invention;

FIG. 2 is a vertical sectional highly diagrammatic view through a portion of a typical overlay of the present invention greatly enlarged; and FIG. 3 is an enlarged vertical sectional highly diagrammatic view of a plywood construction made using an overlay of the present invention.

SUMMARY

The novel wood-resin composite overlays of this invention comprise, in sequential combination:

(A) A base mat of from about 250 to 1000 pounds per 1000 sq. ft. of area comprising ground wood chips of average particle size smaller than about 4 mesh, said chips being coated with from about 6 to 20 percent by weight of resin solids (based upon dry wood chip weight) of a thermosetting resin, the so-coated chips having a total water content of less than about 10 weight percent, said thermosetting resin being adapted to thermoset at a temperature of from about 240 to 380° F. while maintaining a pressure of from about 175 to 400 p.s.i., (B) An interlayer of from about 50 to 75 pounds per 1000 sq. ft. of area comprising a mixture of:

(1) wood fibers having a bulk density of not more than about 0.16 gram per cc. and having an average length to width ratio of at least about 10 to 1, (2) from about 5 to 50 weight percent of resin solids based upon said wood fibers (dry weight basis) of an aqueous thermosettable phenol-formaldehyde resole resin solution, said resin having a number average molecular weight of from about 105 to 5000, (3) said mixture having a total water content of from about 10 to 16 weight percent, and (C) A face coating of from about 1 to 15 pounds based upon resin solids, per 1000 sq. ft. of area, and comprising a said aqueous thermosettable phenol-formaldehydde resole resin solution.

This assembly of such said mat, such layer and such coating is consolidated into the desired overlay by applying to this assembly sufficient pressure to produce a composite structure having a thickness of from about 1/16 inch to 3/16 inch and a specific gravity of from about 0.55 to 0.85 while simultaneously applying sufficient heat thereto to thermoset the thermosetting resins to such an extent that the resulting composite structure has a modulus of rupture of at least about 1000 p.s.i.

The novel plywood products of this invention comprise the combination of:

(A) A plurality of wood veneers arranged face to face in a layered configuration, (B) An overlay of claim 1 positioned so as to have its said base mat arranged face to face with one of the two exposed faces of said layered configuration, thereby to comprise a facing veneer therein, (C) Each veneer being bonded substantially in face-to-face engagement with its adjacent veneer by an adhesive, thereby to provide an integral structure.

Any conventional plywood adhesive may be used, such as an exterior cold-press adhesive, or an exterior hot-press adhesive, the exterior grade adhesives being used in preferred embodiments of the present invention. Conventional plywood manufacturing methods are employed in making plywood products of this invention.

The composite overlays of this invention are made (as suggested above) by following the steps of:

(A) Forming in sequential combination:

(1) A base mat of from about 250 to 1000 pounds per 1000 sq. ft. of area comprising ground wood chips of average particle size smaller than about 4 mesh, said chips being coated with from about 6 to 20 percent by weight of resin solids (based upon dry wood chip weight) of a thermosetting resin, the so-coated chips having a total water content of less than about 10 weight percent, said thermosetting resin being adapted to thermoset at a temperature of from about 240 to 380° F. while maintaining a pressure of from about 175 to 400 p.s.i., (2) An interlayer of from about 50 to 75 pounds per 1000 sq. ft. of area comprising a mixture of:

(a) Wood fibers having a bulk density of not more than about 0.16 gram per cc. and having an average length to width ratio of at least about 10 to 1, (b) From about 5 to 50 weight percent of resin solids based upon said wood fibers (dry weight basis) of an aqueous thermosettable phenol-formaldehyde resole resin solution having a number average molecular weight of from about 105 to 5000, (c) Said mixture having a total water content of from about 10 to 16 weight percent, (3) A face coating of from about 1 to 15 pounds based upon resin solids, per 1000 sq. ft. of area, and comprising a said aqueous thermosettable phenol-formaldehyde resole resin solution, and then, (B) Subjecting the resulting assembly to sufficient pressure to consolidate said mat, said layer and said coating into a composite structure having a specific gravity of from about 0.55 to 0.85 and simultaneously applying sufficient heat thereto to thermoset the thermosetting resins to such an extent that the resulting composite structure has a modulus of rupture of at least about 1000 p.s.i.

These overlays can be made by first laying down the base mat (as on a caul) followed by the interlayer and then the face coating, or by first laying down the face coating (as on a caul) followed by the interlayer and then the base mat; the first procedure is preferred presently.

The new overlays described above possess exceptional surface properties, e.g., tensile strength, permeability, paint hold-out, resistance to blistering, water, chemicals, abrasion, grain raise, fiber pop-up, checking, etc. The overlaid surfaces obtained, particularly when in the form of polywood veneers, may be employed in any number of interior and exterior applications without any further treatment. Resistance to atmospheric conditions and weathering is judged to be excellent in comparison to known wood products.

DESCRIPTION OF DRAWINGS

Referring to FIG. 1, there is seen a diagrammatic presentation of a continuous process for making an overlay of the present invention. A continuous belt 10 of steel or the like is caused to move at a constant velocity past a series of stations. At a first station 11, a base mat 12, having characteristics as above described, is deposited on the surface of the belt 10. The first station 11 can be a conventional felter or the like.

As the belt 10 continues to move, it passes beneath a second station 13 from which an interlayer 14 having characteristics as described above is deposited on the surface of the base mat 12. As the belt 10 continues to move, it passes beneath a third station 16 from which a spray 17 of aqueous thermosettable phenol-aldehyde resole resin solution (as described above) is deposited over the interlayer 14 to make a face coating 15 as described above. As the belt 10 bearing base mat 12, interlayer 14 and face coating 15 continues to move, it passes between a pair of heated pressure rollers 18 and 19 in the nip region of which the composite of base mat 12, interlayer 14 and face coating 15 is compressed and heated generally as described above, and is more particularly illustrated hereinafter. The result is an overlay of the invention.

As the compressed and heated overlay comes off the end of belt 10 (as it bends around on its return transport), the overlays are cut into sheets and stacked conveniently for storage or subsequent use in the manufacture of plywood.

In FIG. 2 is shown a greatly enlarged sectional diagram of an overlay construction of the invention showing in finished form a base layer 21, an interlayer 22 and a facing layer 23.

In FIG. 3 is shown a portion of a plywood construction utilizing an overlay of this invention. The plywood construction comprises four wood veneers numbered respectively, as 24, 25, 26, and 27 with a face veneer 28 consisting of an overlay of this invention. Adhesive between respective adjacent veneers 24 and 25, 25 and 26, 26 and 27, and 27 and 28 bonds the entire assembly together into a composite structure. Observe that the grain in veneers 25 and 27 extends transversely with respect to the grain in veneers 24 and 26.

EMBODIMENTS

The aqueous thermosettable phenol-formaldehyde resole resin solutions indicated above can be any aqueous solution of an alkaline catalyzed phenol-formaldehyde condensate having a number average molecular weight of from about 105 to 5000. Typically, such a resole contains an average of from 1.3 to 3.0 mols of combined formaldehyde per mol of phenol.

Preferably, this resin contains from about 2.0 to 3.0 mols of combined formaldehyde per mol of phenol. In a preferred embodiment, phenolic resins having a number average molecular weight of from about 140 to 550 are employed as providing superior ultimate functional properties. This is considered an unexpected result since low molecular weight phenolaldehyde resins are known to be unsatisfactory for imparting strength to synthetic hardboard products and have been replaced by higher molecular weight resins (see U.S. Pat. 3,180,784 to Meiler). As a further refinement, maximum functional properties are obtained using as Resin B, phenolic resins which have been prepared using milder alkaline, e.g., lime, catalysts which serve to maximize the molar ratio of formaldehyde to phenol in the resin at relatively low molecular weights. The color of the overlay is greatly improved by using at least partially neutralized or even acidified resins; e.g., having a pH of from about 4 to 8.

Conveniently, the moisture contents of the mat, the interlayer and the coating, respectively, are measured after the composite is formed and prior to application of heat and pressure thereto, as indicated.

Concerning the thermosetting resin used to bind together the wood chips in the base mat, little or no criticality exists. The examples below show the use of a highly alkaline phenolic resin of the type taught in many patents; e.g., Redfern Re. 23,747, Van Epps 2,360,376, Stephan et al. 2,437,981, etc. However, equivalent results can be obtained by substituting virtually any thermosetting adhesive resin, such as, for example, other phenol-formaldehyde condensates, aminoplasts, such as e.g., melamine-formaldehyde, urea-formaldehyde, etc., condensates, epoxy resins, proteinaceous adhesives, etc. Such resins are generally employed in the form of aqueous solutions or dispersions, and thermoset under the general conditions indicated.

The wood chips used may be of any type of wood, many acceptable species being mentioned hereinafter during the wood fiber discussion. It is generally in the form of flakes or wood chips having a particle size of less than about 4 mesh on the U.S. sieve scale. Wood chips, such as are employed in the base mat cannot be used as the interlayer, and vice versa. Unless the indicated combination of mat and interlayer are employed, it appears not feasible to produce overlays having both the desired density and strength. In a preferred embodiment the comminuted wood used is hammermill ground wood chips.

As indicated, the wood fibers in the interlayer should have a length to width ratio of at least about 1:10, there being no critical upper limit. Typical commercially available fibers have length to width ratios of from about 1:10 to 1:20. In the interlayer, at less than about 5 weight percent resin content, some desired functional properties of the finished overlay are not obtained, while at greater than about 50 weight percent resin content the mixture becomes difficult to deposit on the substrate. Preferred performance is obtained using from about 7 to 20 weight percent of resin solids, with optimum results being obtained at about 12 to 14 weight percent.

Concerning the facing layer, it has been found that a coverage of at least 1, and preferably at least 2, pounds, based upon resin solids, per 1000 sq. ft. of substrate surface is desirable to insure good surface integrity, i.e., continuity of surface without free fibers appearing in the surface. Coverages of more than about 15 pounds per 1000 sq. ft. cannot be justified. Generally, a maximum coverage of about 6 pounds per 1000 sq. ft. is preferred, and a range of from about 3 to 4 pounds per 1000 sq. ft. appears optimum in terms of performance.

In various embodiments, the resole resin employed may contain as modifiers, various polymeric and/or non-polymeric compositions. For example, the addition of an oil or wax to the resin solution improves the water-resistivity as well as the aging, i.e., durability and weathering characteristics of the overlay. Such oil or wax modifiers are particularly pertinent, for example, to the provision of reusable concrete forms, providing a lubricated surface to aid in separating the form from the concrete. Partability may also be provided using soaps, surfactants or other parting agents as modifiers. Aqueous emulsions or suspensions of vinyl or vinylidene polymers such as e.g., styrene-maleic anhydride copolymers, polyvinyl alcohol polymers, polyvinyl acetate polymers, etc., may be incorporated as modifiers to impart specialized surface properties to the overlay, e.g., flexibility, plasticization, etc. Again, in other embodiments, decorative materials such as pigments, metal flake, stone chips, silica, wollastonite, etc., may be added to the overcoating resin solution, i.e., to Resin B, to provide surfaces which are decorative as well as functional. Similarly, other resins such as melamine-formaldehyde, urea-formaldehyde, acrylic, epoxy, etc., resins may be added.

Acceptable wood fibers for use in this invention may be visualized as resembling match sticks, wool, strings, etc. For more accurate definition, the acceptable wood fibers are delimited herein by their bulk density, as measured by a method hereinafter set forth which provides a measurable indication of their shape. Thus, for the purposes of this invention, wood fibers having a bulk density of up to about 0.16 gram/cc. have been found to provide overlays having suitable functional properties. Best results, however, are obtained using wood fibers having a bulk density of 0.10 gram/cc. or less.

The wood fibers employed in the practice of this invention may be prepared, for example, by defibrating steamed or unsteamed wood chips in a conventional defibrator, e.g., Bauer, Asplund, etc. The defibrator plates may be preset to provide wood fibers of the desired bulk density. While it is preferred to employ wood fibers obtained from soft woods such as, for example, Douglas fir, Hemlock, Pine, Cedar, White Fir, etc., fibers, any available species of wood may be used. Thus, results equivalent to those set forth in the examples are obtained using, for example, Gum, Willow, Poplar, Cherry, Birch, Persimmon, Sycamore, Ash, Elm, Maple, Beech, Hackberry, Oak, Hickory, etc.

The bulk densities delimited herein with respect to the wood fibers are determined according to the following procedure. Five hundred ml. of loosely dispersed wood fibers discharged from an agitator are collected in a 500-ml. graduate. A 100-gram weight having a diameter slightly less than the inside diameter of the graduate is set down lightly on top of the fibers. The graduate is then placed for 1 minute in a vibrator having a displacement of about 0.165 inch and running at a rate of about 1225 oscillations per minute. The volume of wood fibers in the graduate is then noted and the wood fibers are weighed.

Thus, a moisture content of the aggregate fiber interlayer and resin facing layer of from about 15 to 65 weight percent, based upon dry wood fiber, has been found to be desirable. At less than the prescribed minimum respective moisture contents above indicated, the finished overlay exhibits poor surface integrity and low abrasion resistance. Moreover, the surface lacks the requisite strength. At more than the prescribed maximum moisture, respective such contents the wood becomes darkened and there is excessive grain raise. Preferably, moisture contents of from about 18 to 25 percent are employed.

In preparing to make a base mat, the resin and the wood chip are mixed, and the mat is deposited using conventional felting or particle board techniques. Mat thickness is determined by the above-indicated application rates of from about 250 to 1000 pounds of comminuted wood-Resin A mixture per 1000 sq. ft. of surface. Consistent with plywood mill practice 4' x 8' sheets are generally prepared.

The wood fiber/phenolic resin mixture is then deposited as the interlayer upon the comminuted wood mat by conventional felting techniques.

The face coating of resin may also be applied by any conventional technique. Good results have been obtained using spray coating. However, other means, e.g., curtain coating, etc., capable of depositing relatively uniform coatings without disrupting the fibrous structure, may be employed. In a preferred aspect of this invention, the face coating is applied by a transfer-printing technique wherein the desired quantity of resin is coated on a caul or a transfer screen and the coating is partially cured under heat to form a coherent film which is then transferred to the wood fiber-phenolic resin surface during the subsequent hot press, all as illustrated in Example II. The overlays obtained by this technique are characterized by a continuous surface film and exhibit excellent surface properties, e.g., permeability, strength, paint hold-out, etc.

After lay-up, the assembly of base mat, interlayer, and face coating are under pressure and heat.

Conventional plywood pressing conditions and equipment may be employed, but it is to be understood that this invention is not limited in this regard. This feature does, however, illustrate one inherent advantage of the present invention, namely that the particular combination of resins and carefully selected classes of wood particles enables fabrication of present overlays at relatively low pressures, e.g., 100–300 p.s.i., in comparison to those necessary to produce a hardboard product with acceptable surface properties, e.g., 750–1000 p.s.i. Typical pressing temperatures are from 240 to 320° F. In general, the pressing cycle employed can be considerably shorter than that used in preparing conventional high density overlays.

Stops are preferably employed during the hot pressing to secure overlay structures of the desired thickness and density. Thicknesses of $\frac{1}{16}$ inch to $\frac{3}{16}$ inch and specific gravities of 0.55 to 0.85 provide satisfactory results. Thicknesses of $\frac{1}{10}$ inch to $\frac{1}{8}$ inch and specific gravities of 0.6 to 0.8 are preferred.

The wooden products provided by the practice of this invention are possessed of a multitude of desirable surface properties. For example, surfaces which are resistant to abrasion, water, grain-raise, checking, alkalies, physical damage during handling, etc., are obtained. These features, when combined with the excellent tensile strength of the surface, renders plywood panels, constructed using these wooden products as surface veneers, suitable for use as, e.g., reusable concrete forms, structural panels for home and industrial use, etc. It has also been observed that the surfaces obtained require no further preparation for finishing with, e.g., paint, baking enamels, etc. In this latter regard, the surfaces exhibit good adhesion, good paint hold-out, low permeability, superior surface integrity and strength to resist blistering and to provide a smooth grain-free surface. If desired, decorative thermoplastic films may be applied. These panels will also find significant use in applications wherein the surfaces are subjected to wear; e.g., countertops, floors, subflooring, etc.

The wooden products of this invention are useful per se in surfacing various substrates such as wood, metal, ceramics, tile, glass, cement, plaster, etc. They may, therefore, be used to surface countertops, floors, walls, etc. Despite the fact that these overlays exist as self-supporting structures, they are not intended to serve as structural members by themselves. They are by design and intent quite distinct from the typical fiberboard and particle board type products. In a preferred embodiment they are used, as in Example III, as synthetic veneers in the preparation of novel plywood structures. Conventional techniques for the manufacture of plywood may be used substituting the wooden products of this invention for the surface veneers normally used in plywood. Conventional plywood adhesives as well as normal assembly and pressing conditions may be used.

The following examples are presented in illustration of the invention and are not intended as limitations thereon. Where parts are mentioned they are parts by weight.

EXAMPLE I

This example illustrates wood products of this invention prepared using in the overlay a wide variety of phenyl-formaldehyde resins. A series of veneers measuring about 0.16 inch thick are manufactured as follows:

2400 grams of hammermill ground Douglas fir chips (100 percent through an 8 mesh U.S. sieve screen) are blended with 420 grams of an aqueous alkaline solution of a phenolic resin containing about 40 percent resin solids by weight and prepared by condensing 1.0 molar proportion of phenol with about 2.25 molar proportion of formaldehyde in the presence of 0.25 molar proportion of sodium hydroxide under reflux conditions. These resin coated wood chips "adjusted in moisture content to preferably less than 10 percent based on dry chips," are then deposited on a 2' x 4' stainless steel caul in a mat of substantially uniform thickness. To each of a series of mats, prepared as above, is then applied using a gravity duster, about 240 grams of a mixture of wood fibers having a bulk density of about 0.065 gram/cc. and a phenolic resin as characterized in Table A; in each instance the phenolic resin being employed in such proportion and in conjunction with drying to remove water such that the wood fiber-phenolic resin mixture contains about 16 percent resin solids by weight and about 12 percent moisture by weight. An overspray of 35 grams, per assembly, of an aqueous solution containing about 40 percent resin solids by weight of the same phenolic resin used, in each instance, in the wood fiber-phenolic resin mixture is then applied. Finally, each assembly is placed in a hot-press having stops set at about 0.16 inch thickness with a caul on top and pressed at about 320° F. and 175 p.s.i. for 7.5 minutes.

Each overlay, so made, is then used in the manufacture of a 3-ply plywood using exterior hot-press glue and employing the procedure of Example III below. The procedure has excellent paint hold-out and dent resistance in addition to good weatherability characteristics, in each instance.

placed on the wood fiber-phenolic resin mixture surface and the assembly is hot-pressed in a press having stops

TABLE A.—NATURE OF RESIN EMPLOYED IN FIBER-RESIN MIXTURE AND IN OVER-SPRAY

| Example | Panel No. | P/F/Cat. | Catalyst | pH | Solids, wt. percent | Viscosity [1] | Hours cooked at 150° F. | Number average molecular weight |
|---------|-----------|----------|----------|-----|---------------------|---------------|--------------------------|--------------------------------|
| I | 1 | 1/2.25/0.05 | NaOH | 8.9 | 52 | 18 | 6.5 | 197 |
| I | 2 | 1/2.25/0.1 | Same | 9.1 | 52 | 18 | 3.75 | 220 |
| I | 3 | 1/1.5/0.2 | ___do___ | 9.7 | 51 | 15 | 1.25 | 150 |
| I | 4 | 1/2.25/0.2 | ___do___ | 9.5 | 53 | 23 | 2.4 | 230 |
| I | 5 | 1/3.0/0.2 | ___do___ | 9.5 | 51 | 50 | 5.5 | 318 |
| I | 6 | 1/1.4/0.03 | Triethyl amine | 8.0 | 58 | 20 | 10 | 175 |
| I | 7 | 1/2.25/0.2 | Triethanol amine | 8.0 | 50 | 14 | 10 | 180 |
| I | 8 | 1/3.0/0.2 | Lime [2] | 6.0 | 40 | 15 | 2.75 | 243 |
| I | 9 | 1/2.25/0.2 | NaOH | 9.2 | 51 | [3] 66 | 3.75 | 415 |
| I | 10 | 1/2.25/0.2 | Same | 9.2 | 51 | [4] 1,050 | ([5]) | 654 |
| I | 11 | 1/2.25/0.2 | NaOH [6] | 6.5 | 39 | 15 | 2.4 | 230 |
| I | 12 | 1/2.25/0.2 | NaOH [7] | 6.1 | 48 | 14 | 2.4 | 230 |
| I | 13 | 1/2.25/0.75 | NaOH | 11.0 | 40 | 250 | | 2,200 |

[1] At 70° F. on the MacMichael 30d scale.
[2] Neutralized bubbling $CO_2$ through the resin and filtering out $CaCO_3$.
[3] This is the resin used in preparing panel No. 2, but bodied to a higher molecular weight and viscosity.
[4] This is the resin used in preparing Nos. 2 and 9 but bodied to a still higher molecular weight.
[5] Plus bodying.
[6] This is the resin used in preparing panel No. 4, but acidified with $H_2SO_4$.
[7] This is the resin used in preparing panel No. 4, but acidified with HCl.

In each instance, the wood products prepared in Example I exhibit excellent mechanical properties. Accelerated aging tests according to ASTM D–1037–60T, as well as conventional Weatherometer tests, and so-called "blister-box" tests wherein the back side of the panel is subjected to a 95–100 percent relative humidity at 120° F., with the face at ambient conditions, for 1 month show no fiber pop-up, no grain-raise, no checking and no blistering. Moreover, these wood products possess excellent resistance to abrasion, scuff, dent, check, etc., as well as excellent paint hold-out.

EXAMPLE II

This example illustrates wood products of this invention prepared using a novel transfer printing technique for applying the surface resin layer as a continuous film.

2400 grams of hammermill ground Douglas fir chips (100 percent through an 8 mesh U.S. sieve screen) are blended with 420 grams of an aqueous alkaline solution of a phenolic resin containing about 40 percent resin solids by weight and prepared by condensing 1.0 molar proportion of phenol with about 2.25 molar proportion of formaldehyde in the presence of 0.25 molar proportion of sodium hydroxide under reflux conditions. The resin coated wood chips having a moisture content of 8% are then deposited on a 2′ by 4′ stainless steel caul in a mat of substantially uniform thickness. To this mat is then applied, using a gravity duster, about 240 grams of a mixture of wood fibers having a bulk density of about 0.065 gram/cc. and a phenolic resin containing about 40 percent solids by weight and prepared by condensing 1.0 molar proportion of phenol with about 3.0 molar proportion of formaldehyde in the presence of 0.2 molar proportion of lime while cooking at about 150° F. for 2.75 hours; said resin being neutralized to a pH of about 6.0 by bubbling carbon dioxide through the resin and filtering out calcium carbonate and said resin having a number average molecular weight of about 243. The mixture of fibers and resin has a moisture content of about 16 percent based on dry fiber. A 2′ by 4′ stainless steel caul is coated, at an application rate of 17 pounds per 1000 sq. ft., with an aqueous slurry of the following formulation wherein the phenolic resin is the same lime catalyzed phenol-formaldehyde condensate used above in admixture with the low bulk density wood fibers.

| Component: | Parts |
|---|---|
| Aqueous phenolic resin solution | 100 |
| ASP 100 Clay | 40 |
| Titanium dioxide pigment | 10 |
| Potassium soap of tall oil and soybean oil | 10 |

The coated caul is then dried in a 130° F. oven for 20 minutes. The thus prepared resin coated caul is then set at about 0.16 inch thickness at about 300° F. and 175 p.s.i. for 7 minutes. The resulting wood product shows all of the properties reported for the wood products prepared in Example I. However, products made using the transfer resin film coating technique of this example have a surface of a continuous resin film and exhibit excellent paint hold-out, providing, in effect, the preprimed surfaces whereon one-coat paint coverage can be achieved. Modulus of rupture tests on specimens measuring 2″ by 8″ by 0.16 inch thick across a 6-inch span using a 2-inch per minute head speed show the following results:

Position:                                                     MOR, lbs./sq. in.
    Overlay on top (strength of substrate) _____ 1310
    Overlay on bottom (strength of overlay) _____ 2130

EXAMPLE III

This example illustrates the manufacture of 5-ply, 13/16 inch Douglas fir plywood using the wood product of Example II as one of the surface veneers.

One 1/8 inch and three 3/16 inch Douglas fir veneers, each measuring 2′ by 4′, are laid up in order with alternating grains after first coating the second and fourth veneers on both faces with a phenolic resin adhesive at an application rate of 60 pounds per 1000 sq. ft. of double glue line. The adhesive is one conventionally used to bond exterior grade plywood and is compounded from filler, digesting chemicals, and 40 percent by weight solids phenolic resin so as to contain 22 percent by weight phenolic resin solids. The 40 percent solids resin is prepared by condensing 1.0 molar proportion of phenol with about 2.5 molar proportions of formaldehyde in the presence of 0.75 molar proportion of sodium hydroxide under reflux conditions. The wood product prepared in Example II is then placed, overlaid side up, on top of the fourth veneer and the entire plywood assembly is hot-pressed at 300° F. and 175 p.s.i. for 6.5 minutes.

EXAMPLE IV

This example illustrates the manufacture of 3-ply 3/8 inch interior grade Douglas fir plywood by the cold-press process using the wood product of Example II as one of the surface veneers.

One 2′ by 4′ 1/8-inch Douglas fir veneer is coated on both sides with a conventional soybean plywood glue at the rate of 125 pounds per 1000 sq. ft. and is placed directly on another 2′ by 4′ 1/10-inch veneer with grain at right angles. The sheet wood product of Example II 2′ by 4′ is next placed on the coated veneer to make a 3-ply assembly, the fiber side up and the wood particle side abutting the coated center ply. A soybean plywood adhesive available commercially under the trade designation Monsanto 1144 is employed. Another similar suitable plywood adhesive is available under the trade designation AM-190 from Pacific Resins and Chemicals, Inc. The assembly is then cold-pressed at 175 p.s.i. for 20 minutes to make an integral panel of composite plywood.

The panel product has a smooth grain-free surface admirably suited to rapid and easy painting. Latex paints that normally must be used with an oil primer on new wood can be applied directly to this surface without priming. The panel product is useful in a variety of interior applications where a hard impact-resistant relatively stiff strong and workable material is desired.

EXAMPLE V

This example illustrates a reverse assembly procedure. The procedure of Example II is repeated except that the face coating is first deposited on a caul (by the transfer technique) followed by the interlayer and then the base mat. When this assembly is hot-pressed as described in Example II, an overlay of the invention is formed.

Unless otherwise specifically indicated in each of the foregoing examples, the base mat, the interlayer, and the face coating, as well as the respective component materials of each, have characteristics and amounts, respectively, as specified above in the summary section.

What is claimed is:

1. The method of making a wood-resin overlay sheet adapted for use as a synthetic facing veneer comprising the steps of:
    (A) forming in sequential combination:
        (1) a base mat of from about 250 to 1000 pounds per 1000 sq. ft. of area comprising ground wood chips of average particle size smaller than about 4 mesh, said chips being coated with from about 6 to 20 percent by weight of resin solids (based upon dry wood chip weight) of a thermosetting resin, the so-coated chips having a total water content of less than about 10 weight percent, said thermosetting resin being adapted to thermoset at a temperature of from about 240 to 380° F. while maintaining a pressure of from about 175 to 400 p.s.i.,
        (2) an interlayer of from about 50 to 75 pounds per 1000 sq. ft. of area comprising a mixture of:
            (a) wood fibers having a bulk density of not more than about 0.16 gram per cc. and having an average length to width ratio of at least 10 to 1, and
            (b) from about 5 to 50 weight percent of resin solids based upon said wood fibers (dry weight basis) of an aqueous thermosettable phenolformaldehyde resole resin solution having a number average molecular weight of from about 105 to 5000,
        said mixture having a total water content of from about 10 to 16 weight percent,
        (3) a face coating of from about 1 to 15 pounds based upon resin solids, per 1000 sq. ft. of area, of said aqueous thermosettable phenol-formaldehyde resole resin solution,
    the total moisture content of the interlayer (2) and face coating (3) being from 15 to 65 weight percent, and then
    (B) subjecting the resulting assembly comprising said mat, said layer and said coating to sufficient pressure to consolidate such into a composite structure having a thickness of from about $\frac{1}{16}$ inch to $\frac{3}{16}$ inch and a specific gravity of from about 0.55 to 0.85 and simultaneously applying sufficient heat thereto to thermoset the thermosetting resins to such an extent that the resulting composite structure has a modulus of rupture of at least about 1000 p.s.i.

2. A wood-resin overlay sheet as prepared by the method of claim 1.

3. A plywood product comprising:
    (A) a plurality of wood veneers arranged face to face in a layered configuration and
    (B) an overlay sheet of claim 2 positioned so as to have its said base mat arranged face to face with one of the two exposed faces of said layered configuration thereby comprise a facing veneer therein,
    the assembly of (A) and (B) being adhesively bonded to provide an integral structure.

4. The method of making a wood-resin overlay sheet adapted for use as a synthetic facing veneer in plywood comprising the steps of:
    (A) depositing on a support a base mat of from about 250 to 1000 pounds per 1000 sq. ft. of area comprising ground wood chips of average particle size smaller than about 4 mesh, said chips being coated with from about 6 to 20 percent by weight of resin solids (based upon dry wood chip weight) of a thermosetting resin, the so-coated chips having a total water content of less than about 10 weight percent said thermosetting resin being adapted to thermoset at a temperature of from about 240 to 380° F. while maintaining a pressure of from about 175 to 400 p.s.i.,
    (B) applying over said base mat an interlayer of from about 50 to 75 pounds per 1000 sq. ft. of area comprising a mixture of:
        (1) wood fibers having a bulk density of not more than about 0.16 gram per cc. and having an average length to width ratio of at least about 10 to 1, and
        (2) from about 5 to 50 weight percent of resin solids based upon said wood fibers (dry weight basis) of an aqueous thermosettable phenolformaldehyde resole resin solution having a number average molecular weight of from about 105 to 5000,
    said mixture having a total water content of from about 10 to 16 weight percent, and
    (C) applying over the surface of said interlayer a face coating of from about 1 to 15 pounds based upon resin solids, per 1000 sq. ft. of area, of said aqueous thermosettable phenolformaldehyde resole resin solution,
    the total moisture content of the interlayer (B) and face coating (C) being from 15 to 65 weight percent, and then
    (D) subjecting the resulting assembly to sufficient pressure to consolidate said mat, said layer and said coating into a composite structure having a specific gravity of from about 0.55 to 0.85 and simultaneously applying sufficient heat thereto to thermoset the thermosetting resins to such an extent that the resulting composite structure has a modulus of rupture of at least about 1000 p.s.i.

5. The method of making a wood-resin overlay sheet adapted for use as a synthetic facing veneer comprising the steps of:
    (A) depositing on a support a face coating of from about 1 to 15 pounds based upon resin solids, per 1000 sq. ft. of area, of an aqueous thermosettable phenol-formaldehyde resole resin solution having a number average molecular weight of from about 105 to 5000,
    (B) applying over said face coating an interlayer of from about 50 to 75 pounds per 1000 sq. ft. of area comprising a mixture of:
        (1) wood fibers having a bulk density of not more than about 0.16 gram per cc. and having an average length to width ratio of at least about 10 to 1, and
        (2) from about 5 to 50 weight percent of resin solids based upon said wood fibers (dry weight basis) of said aqueous thermosettable phenolformaldehyde resole resin solution,
    said mixture having a total water content of from about 10 to 16 weight percent,
    the total moisture content of the face coating (A) and interlayer (B) being 15 to 65 weight percent, (C) depositing on over said interlayer a base mat of from about 250 to 1000 pounds per 1000 sq. ft. of area comprising ground wood chips of average particle size smaller than about 4 mesh, said chips being coated with from about 6 to 20 percent by weight of resin solids (based upon dry wood chip weight) of a thermosetting resin, the so-coated chips having a total water content of less than about 10 weight percent, said thermosetting resin being adapted to thermoset at a temperature of from about 240 to 380° F. while maintaining a pressure of from about 175 to 400 p.s.i., and (D) subjecting the resulting assembly to sufficient pressure to consolidate said base mat, said interlayer and said face coating into a composite structure having a thickness of from about 1/16 inch to 3/16 inch and a specific gravity of from about 0.55 to 0.85 and simultaneously applying sufficient heat thereto to thermoset the thermosetting resins to such an extent that the resulting composite structure has a modulus of rupture of at least about 100 p.s.i.

References Cited

UNITED STATES PATENTS

| | | | |
|---|---|---|---|
| 2,343,740 | 3/1944 | Birmingham | 156—324 |
| 2,601,349 | 6/1952 | Welch | 264—112X |
| 3,061,878 | 11/1962 | Chapman | 264—112X |
| 3,098,781 | 7/1963 | Greten | 264—113X |

JOHN T. GOOLKASIAN, Primary Examiner

W. E. HOAG, Assistant Examiner

U.S. Cl. X.R.

156—62.2, 242, 324; 161—151, 162, 170, 258, 261, 270; 264—113